United States Patent [19]

Morris et al.

[11] 4,095,477

[45] Jun. 20, 1978

[54] TWO AXIS RATE GYRO

[75] Inventors: Harold D. Morris, Orinda, Calif.; Romeal F. Asmar, Bellevue, Wash.

[73] Assignee: Systron-Donner Corporation, Concord, Calif.

[21] Appl. No.: 803,797

[22] Filed: Jun. 6, 1977

Related U.S. Application Data

[63] Continuation of Ser. No. 659,266, Feb. 19, 1976, abandoned.

[51] Int. Cl.² .......................................... G01C 19/28
[52] U.S. Cl. ................................. 74/5.6 D; 73/505
[58] Field of Search ............ 74/5.6 D; 340/196; 73/505

[56] References Cited

U.S. PATENT DOCUMENTS

| 3,176,523 | 4/1965 | Amlie et al. ................... 74/5.6 D |
| 3,321,753 | 5/1967 | Buckingham et al. ............. 340/196 |
| 3,559,492 | 2/1971 | Erdley ........................... 74/5.6 D |

Primary Examiner—Allan D. Herrmann
Attorney, Agent, or Firm—Flehr, Hohbach, Test, Albritton & Herbert

[57] ABSTRACT

A two axis rate gyro for sensing angular velocity about two input axes includes a rotating disc which is bearing mounted in a framework. A motor is provided for driving the disc rotationally in the bearing mounts. Pickoffs are mounted in the framework which are spaced from the faces of the rotor and oriented along axes which are orthogonal to the two angular velocity input axes. Circuitry is provided for receiving the outputs from each of the orthogonally oriented pickoffs, including circuit means for removing noise in the outputs due to variation caused therein by spacing variation between the rotor faces and the pickoffs resulting from departure of the rotor faces from a flat condition.

19 Claims, 9 Drawing Figures

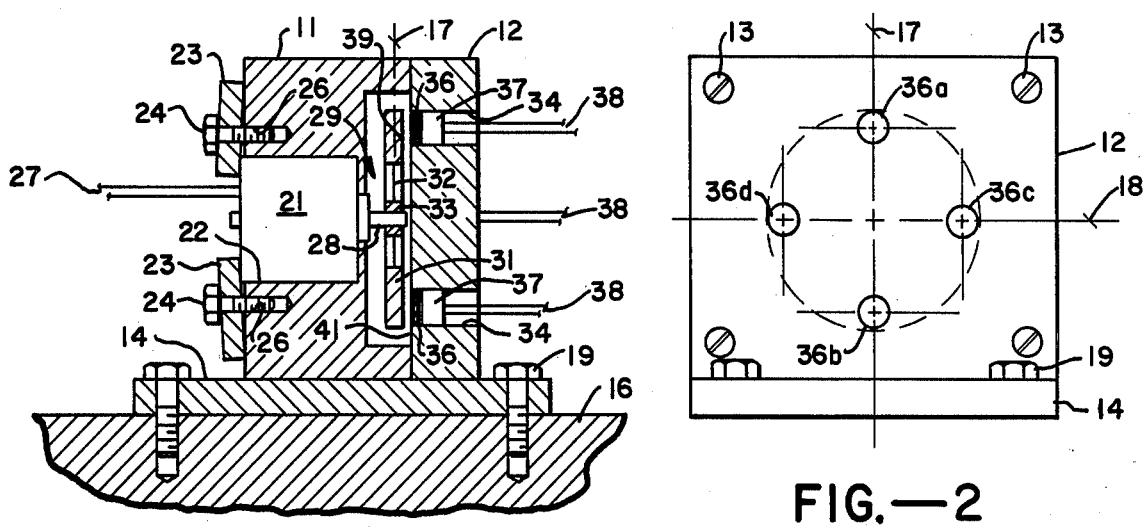
FIG.—1
FIG.—2
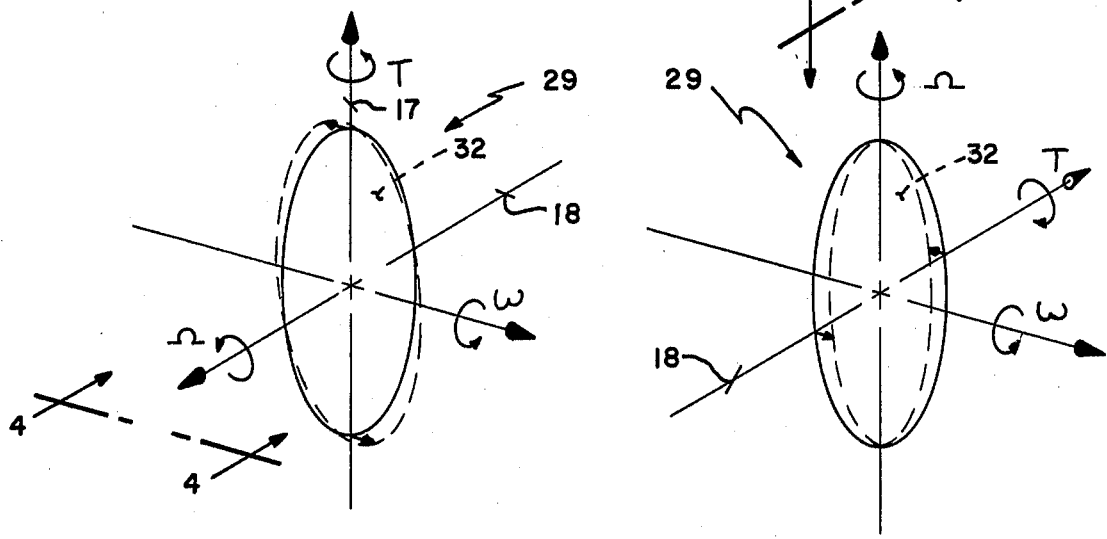
FIG.—3
FIG.—5
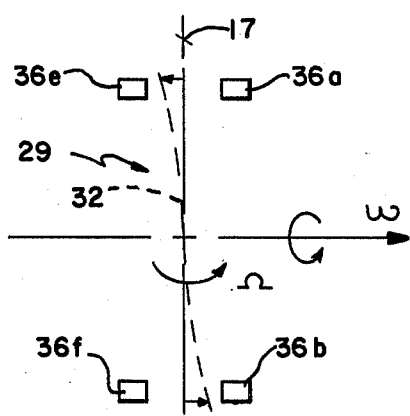
FIG.—4
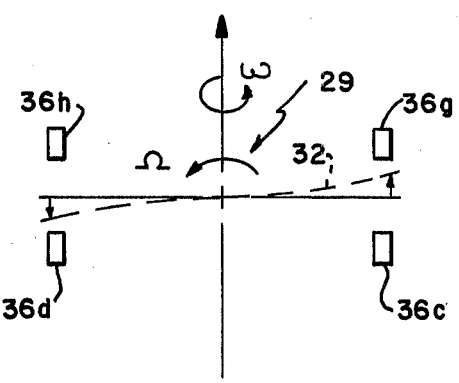
FIG.—6

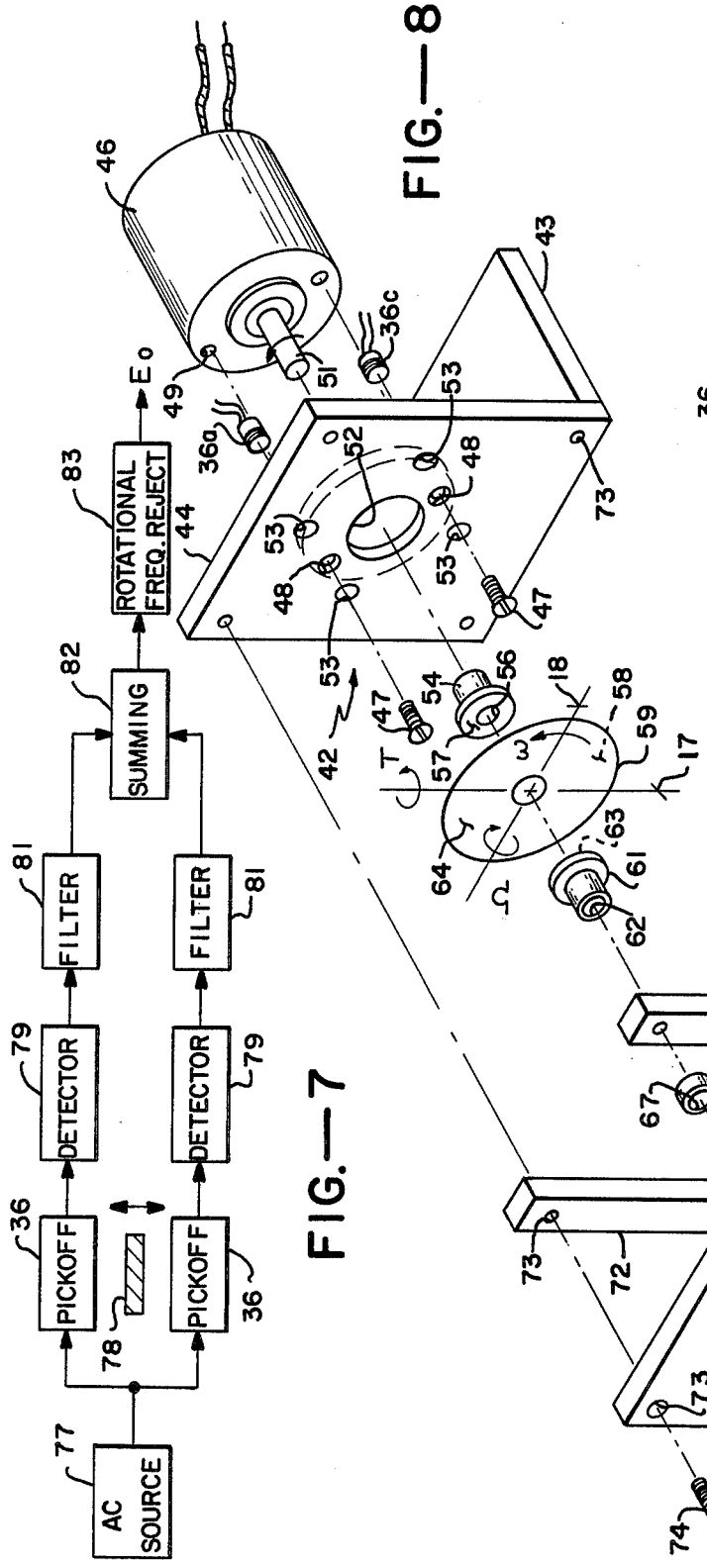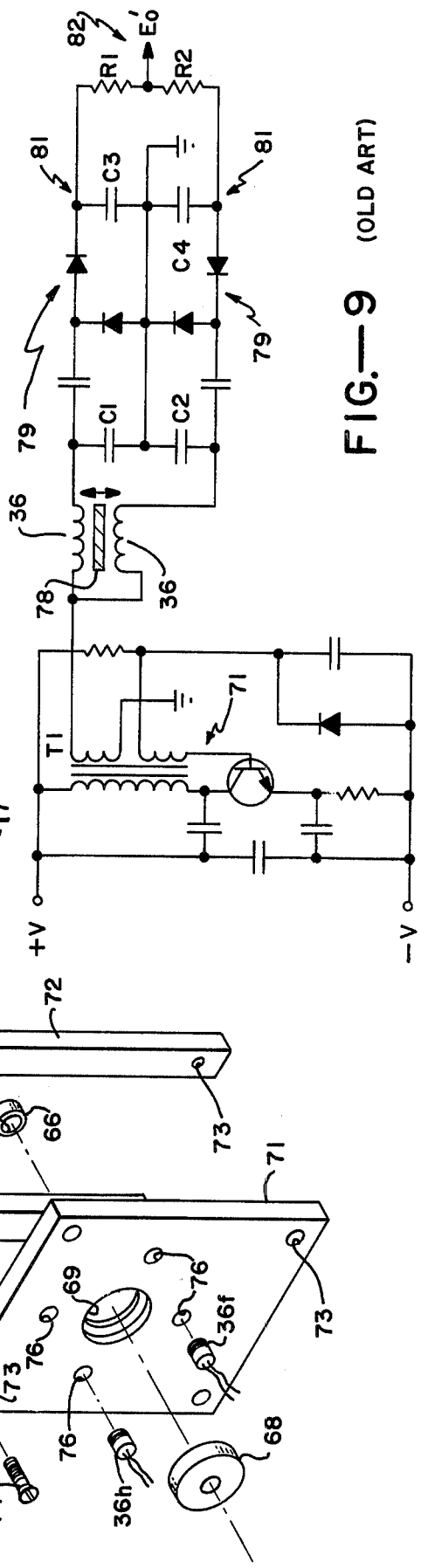

TWO AXIS RATE GYRO

This is a continuation, of application Ser. No. 659,266 filed Feb. 19, 1976 now abandoned.

BACKGROUND OF THE INVENTION

This invention relates to an instrument for sensing angular velocity about a plurality of intersecting axes, and more particularly to such multi-axis angular velocity sensors for use in autopilots and the like.

A wide variety of multi-axis angular velocity sensors have been proposed in the past including multi-spinning rotor devices with individual rotor spring restraint about axes orthogonally oriented to the desired angular velocity sensing axes. Other schemes have utilized rotating angular acceleration devices with integration circuits and rotational demodulation for determining angular velocity about predetermined axes. These devices are in general quite complex and consequently expensive.

A simple two axis angular velocity sensing device is needed for applications where linear and angular acceleration environments are not severe, and which has a frequency response bandwidth sufficiently extensive to be useful in piloted and remotely piloted airborne vehicles.

SUMMARY AND OBJECTS OF THE INVENTION

In general, the device disclosed herein is a multi-axisangular velocity sensor for sensing angular velocity about two intersecting axes. A framework supports a rotor mounted for rotational movement relative to the framework. A motor is mounted in the framework for driving the rotor rotationally. The rotor has integral means for permitting restrained rotation of the rotor about first and second diametral axes which are orthogonal to one of the two intersecting axes. The rotor is urged toward a neutral spin plane by the means for permitting restrained rotation in the absence of torques about the two intersecting axes. The rotor periphery is displaced about the diametral axes against the integral means for restraining rotation thereabout in the presence of torques about the two intersecting axes. Pickoffs are mounted in the framework spaced from the faces of the rotor for producing output signals related to the spacing therefrom. The pickoffs are aligned along each of the two intersecting axes, whereby angular velocity inputs about one of the two intersecting axes causes an output to be produced from the pickoffs aligned therewith.

It is an object of the present invention to provide a multi-axis angular velocity sensor producing multiple stable outputs related to multiple angular velocity inputs.

Another object of the present invention is to provide a multi-axis angular velocity sensor construction for use in typical airframe linear and angular acceleration environments.

It is another object of the present invention to provide a multi-axis angular velocity sensor having an integrally restrained rotating member.

Additional objects and features of the invention will appear from the following description in which the preferred embodiment has been set forth in detail in conjunction with the accompanying drawings.

BRIEF DESCRIPTION OF THE DRAWINGS

FIG. 1 is a sectional view of one embodiment of the present invention.

FIG. 2 is a front elevational view of the embodiment of FIG. 1.

FIG. 3 is an isometric view of the motion of the rotating member in the present invention.

FIG. 4 is a side elevational view of the motion of the rotating member taken along the line 4—4 of FIG. 3.

FIG. 5 is an isometric view of the motion of the rotating member in the present invention.

FIG. 6 is a plan view of the rotating member taken along the line 6—6 of FIG. 5.

FIG. 7 is a block diagram of the circuit components for one axis of information in the present invention.

FIG. 8 is an exploded isometric view of another embodiment of the present invention.

FIG. 9 is a circuit diagram of one type of circuit for use in conditioning the signal for one axis of information in the present invention.

DESCRIPTION OF THE PREFERRED EMBODIMENTS

Referring to FIG. 1, a multi-axis angular velocity sensor is shown having a first framework portion 11 and a second framework portion 12. Framework portions 11 and 12 are joined by means such as screws 13 seen in FIG. 2. A mounting base 14 supports framework portions 11 and 12 and is in turn mounted upon a portion of a body 16 which is to be monitored in angular velocity about two intersecting axes 17 and 18. Base 14 is attached securely to body 16 by means such as bolts 19.

A motor 21 is shown mounted in a bore 22 formed in framework portion 11. Clamps 23 contact one end of motor 21, being pressed firmly thereagainst by bolts 24 entering threaded holes 26 in framework portion 11.

Power leads 27 are connected to motor 21 for energizing the motor. A shaft 28 extends from one end of motor 21 being driven rotationally thereby. A rotor 29 having an electrically conductive peripheral ring 31, also has a centrally located web or diaphragm 32 having a spring rate $k$ about any diameter. Diaphragm 32 is coupled to shaft 28 by means of a shaft clamp 33. It should be understood that the rotor 29 may be represented by diaphragm 32 alone without peripheral ring 31.

Framework portion 12 has formed therein four bores 34 for receiving pickoffs 36. Pickoffs 36 are preferably but not necessarily the type described in U.S. Pat. No. 3,321,753. Pickoffs 36, as described therein, are mounted on a support block 37 fashioned to fit in bores 34. Electrical leads 38 are connected to pickoffs 36. It may be seen that one face 39 of peripheral ring 31 on rotor 29 is spaced from pickoffs 36. Pickoffs 36 are mounted flush with a face 41 on framework portion 12 which opposes face 39 on rotor 29. Additional pickoffs 36 may be placed in framework portion 11 in opposing position to pickoffs 36 shown in framework portion 12 for purposes hereinafter described.

Turning to FIG. 3, the manner in which diaphragm 32 is flexed to provide for variation in spacing between face 39 and pickoffs 36 may be shown. According to basic principles of gyroscopic behavior, a spin vector $\omega$, associated with a rotating mass of angular momentum H, will undergo a precession rate $\Omega$ such that $\omega$ will tend to align itself with an applied moment vector. Thinking of the moment vector as a torque T, the relationship $T = \Omega H = \Omega f(\omega)$ exists when the vector T is orthogonal to the vector $\omega$. When an angular velocity is applied about axis 17 to a framework such as 11, 12 supporting a rotating mass such as 31, 32, a torque T about axis 17, having the sense shown, is applied by the framework to the rotating mass. Using right hand convention, for the spin rotation represented by $\omega$, the precession rate $\Omega$ is induced in the rotating mass represented by rotor 29. Consequently, diaphragm 32 is flexed to assume the position shown in dashed line in FIG. 3, as the precession rate $\Omega$ is opposed by the spring rate $k$ of diaphragm 32. Referring to FIG. 4, a side view of the deflection of diaphragm 32 about one of its diameters (axis 18) is seen, also in dashed line. It may be seen in FIG. 4 that the flexing of diaphragm 32 allows the periphery of rotor 29 to increase the spacing from pickoff 36a in FIG. 4 and decrease the spacing from pickoff 36b in FIG. 4.

Reference to FIG. 5 shows the manner in which diaphragm 32 flexes for an angular velocity input about axis 18. An angular velocity input about the axis 18 gives rise to torque T thereabout as described above. For angular rotation of rotor 29 as shown by $\omega$, an angular precession rate $\Omega$ occurs. Consequently, diaphragm 32 on rotor 29 is flexed as shown in FIG. 5 displacing the periphery of the rotor 29 as shown. FIG. 6 shows the spacing between pickoff 36c and the periphery of rotor 29 increasing and the same spacing relative to pickoff 36d decreasing. A consequent output is produced by the pickoffs as described in the above-referenced United States patent.

Referring now to FIG. 8, an embodiment of the present invention is seen in which a framework 42 has a mounting base 43 and a motor mount 44. A motor 46 is mounted in motor mounting plate 44 by means of screws 47, which pass through counter sunk holes 48 in motor mount 44 and engage threaded holes 49 in the face of motor 46. Motor 46 has a shaft 51 which extends through a bore 52 in motor mount 44, when motor 46 is mounted thereupon. Four bores 53 are formed in motor mounting plate 44 for receiving pickoff coils 36a through 36d as indicated in FIGS. 4 and 6 described above.

A first rotor clamp 54 is provided with a bore 56 formed therethrough for surrounding shaft 51. Rotor clamp 54 has a clamping face 57 for contacting a first face 58 on a disc type rotor 59. A second rotor clamp 61 has a bore 62 passing therethrough for surrounding shaft 51, and a clamping face 63 for contacting a second face 64 on rotor 59. A shaft spacer 66 has a bore 67 therethrough for surrounding shaft 51 and for contacting the inner race on a bearing 68. The inner race of bearing 68 is adapted to surround shaft 51 and the outer race is adapted to fit within a bearing bore 69 formed in a sensor mounting plate 71. A pair of spacer bars 72 are provided for insertion between motor mounting plate 44 and sensor mounting plate 71 for allowing space in which rotor 59 may rotate unimpeded therebetween. A plurality of holes 73 are formed in the corners of motor mount 44, sensor mounting plate 71 and in the ends of spacer bars 72 for receiving fasteners such as screws 74 for retaining the assembly in assembled condition. Four holes 76 are formed in sensor mounting plate 71 which are substantially the same as bores 34 in second framework portion 12 of FIGS. 1 and 2. Mounted in bores 76 are pickoffs 36e through 36h as indicated in FIGS. 4 and 6 described above and which are the same as pickoffs 36a through 36d.

Referring now to FIG. 7, an AC source 77 is shown connected to excite a pair of opposing pickoff coils 36 having a moving metallic member 78 disposed therebetween. The metallic member 78 is the periphery of rotor 59 in this embodiment. Output is produced from pickoffs 36 above, which is connected to respective detectors 79. Filters 81 receive the output from detectors 79 and direct both outputs to a summing circuit 82. A filter 83 is provided for removing the rotational frequencies of rotor 59, thereby producing an output $E_o$.

The block diagram of FIG. 7 is shown in schematic form in FIG. 9 up through summing circuit 82. The circuit of FIG. 9 is old in the art and is presented herein to provide an enabling disclosure. Filter 83 is not shown in FIG. 9 as it may be any type of filter for rejecting a predetermined band of frequencies which is related to the rotational frequencies of rotor 59. AC source 77 is an oscillator having DC inputs $+V$ and $-V$. Pickoff coils 36 are excited as shown through transformer T1 and moving element 78 is shown positioned between pickoff coils 36. Pickoff coils 36 are tuned to resonance by capacitors C1 and C2 and the outputs from the tuned circuits are delivered to detectors 79 as shown. Filters 81 are represented by capacitors C3 and C4 and the filtered output from detectors 79 is delivered to summing resistors R1 and R2, representing summing circuit 82. Output $E_o'$ represents the output from the disclosed device prior to rejection of the frequencies of rotation arising from deviation from flatness, for example, in rotor 59.

The manner in which the embodiment of FIG. 8 functions is described as follows. In the assembled condition, motor 46 drives shaft 51 and rotor 59 clamped thereto rotationally. Rotor 59 is clamped to shaft 51 by means of first and second rotor clamps 54 and 61. Clamping face 57 is placed in firm contact with first rotor face 58 and clamping face 63 is placed in firm contact with second rotor face 64. The outer end of shaft 51 is supported on bearing 68 which is spaced from second rotor clamp 61 by spacer 66.

Rotor 59 is a thin disc-like member in this embodiment, having spring-like characteristics for small deflections of the periphery of rotor 59 about any diameter thereof. Bores 76 in sensor mounting plate 71 may be seen to overlie bores 53 in motor mounting plate 44 when in the assembled condition. Pickoffs 36 are mounted to be flush or slightly below the opposing faces of motor mounting plate 44 and sensor mounting plate 71. Reference to FIG. 4 shows pickoffs 36b and 36f which are also shown in their appropriate position in FIG. 8. A counter clockwise input rate looking downwardly on the top of input axis 17 gives rise to a torque T having the same sense. Torque T causes rotor 59 to attempt to precess at a precessional rate $\Omega$ depending upon the magnitudes of torque T and angular momentum H. H is a product of the polar moment of inertia J of rotor 59 and rotor speed $\omega$. Rotor 59 therefore attempts to rotate about axis 18, flexing as shown in FIGS. 3 and 4. Since there is an integral spring rate within rotor 59 about diameter 18, a predetermined degree of flex is obtained for a predetermined input torque T, or angular velocity, since precession rate $\Omega$ is opposed by the spring rate of rotor 59. FIG. 4 clearly shows, in exaggerated form, the relationship which would then exist between pickoffs 36b and 36f and the periphery of rotor 59 in dashed line. As described in the above-referenced U.S. patent disclosing the operation of pickoffs 36, the output from the coil 36 will increase and the output from the other coil 36 will decrease, thereby providing outputs which are summed to provide a total output $E_o'$.

Since rotor 59 need move only slightly at the periphery thereof which is disposed between opposing pickoffs 36, any deviation in flatness of rotor 59 will produce output from pickoff 36. Motor 46 rotates rotor 59 at a known rotational frequency. Therefore filter 83 may be devised by well known filter design techniques to reject the particular band of signal frequencies arising from the rotational frequency or rotor 59. Alternatively, if motor 46 drives rotor 59 at a sufficiently high angular velocity, $\omega$, a low pass filter may practically be used which attenuates all rotational frequencies of rotor 59 above the filter cut off frequency and passes all frequencies of displacement of the periphery of rotor 59 resulting from angular velocity inputs which are below the cut off frequency of filter 83. The foregoing description applies with equal force to the operation of the disclosed invention for angular velocity inputs about axis 18, with the provision that pickoff coils 36c, 36g, and 36d, 36h would be involved.

In the embodiment of FIG. 8 the motor mount 44 and the sensor mounting plate 71 are seen to have opposing faces separated by a distance determined by the thickness of spacer bars 72. When the separation is relatively small, a spaced shroud effectively encloses the spinning rotor, spaced from the faces 64 and 58 thereof. A film of the gas in which the rotor 59 is spinning may therefore be built up between the faces 64 and 58 and the opposing faces of sensor mounting plate 71 and motor mount 44 respectively. In this fashion, oscillation of the periphery of rotor 59 in a direction parallel to the axis of spin $\omega$ is damped by the energy absorbing qualities of the gas films.

Linear acceleration along an axis parallel to the axis of spin $\omega$ may cause the peripheries of rotor 59 on opposite ends of a diameter thereof to deflect in a common direction. Signals caused by such common direction deflection are not representative of angular rate input and constitute error signals. Pickoff coils 36a, b, c and d of FIG. 4 may be connected to cause signals so generated to be cancelled. In like fashion pickoff coils 36c, d, g and h may be connected to cause signals so generated to be cancelled.

A dual axis angular velocity sensor has been disclosed which does not depend on gimbal pivots and which is capable of operation in angular and linear acceleration environments encountered in most manned and remotely controlled vehicle applications.

What is claimed is:

1. A multi-axis angular velocity sensor for sensing angular velocity about two intersecting axes, comprising a framework, a motor mounted on said framework, an output shaft on said motor for providing rotational motion, a rotor having a spin axis aligned with and coupled to said motor output shaft, said rotor having a continuous periphery and opposite rotor faces, means integral with said rotor deflecting in a bending mode for permitting restrained rotation of said rotor about any rotor diametral axis, so that when angular velocity inputs are applied about the two intersecting axes said continuous rotor periphery moves in restrained rotation about first and second diametral axes which are each substantially orthogonal to one of the two intersecting axes, said means for permitting restrained rotation having an angular spring rate for urging said continuous rotor periphery toward a neutral spin plane in the presence of torques about said first and second axes, and a plurality of pickoff means spaced from said rotor faces for producing an output signal related to the spacing therefrom.

2. A multi-axis angular velocity sensor as in claim 1 wherein said means for permitting restrained rotation comprises a flexible diaphragm, and means for attaching said flexible diaphragm to said output shaft, said flexible diaphragm extending between said continuous rotor periphery and said output shaft.

3. A multi-axis angular velocity sensor as in claim 1 wherein said rotor comprises a flexible diaphragm attached to said output shaft.

4. A multi-axis angular velocity sensor as in claim 1 together with first and second planar surfaces in spaced proximate relation to each of said opposite rotor faces, whereby gas films are formed between said first and second planar surfaces and ones of said opposite rotor faces when said rotor is spinning, thereby providing gas damping of oscillatory motion of said continuous rotor periphery in an axial direction.

5. A multi-axis angular velocity sensor as in claim 1 wherein said plurality of pickoff means includes pickoffs spaced from each of said opposite rotor faces positioned on opposite ends of a diameter of said rotor, said pickoffs being interconnected so that rotor periphery deflection in the same direction at opposite ends of the diameter of said rotor due to linear acceleration in a direction parallel to the axis of spin of said rotor produces substantially cancelling components in said output signal.

6. A two axis angular velocity sensor for sensing angular velocity about first and second intersecting axes, comprising a framework, a rotor mounted for rotational movement about a rotor spin axis relative to said framework, a continuous periphery on said rotor having opposing planar faces, a motor mounted on said framework driving said rotor rotationally about said rotor spin axis, means for coupling said rotor to said motor, said last named means including means for permitting restrained rotation about any diameters of said rotor, said means for permitting restrained rotation operating to urge said rotor toward a neutral plane of rotation in the presence of torques about any of said rotor diameters, and first and second pickoff means mounted in said framework disposed in spaced relation with said planar faces on said rotor and aligned with the first and second intersecting axes for providing respective first and second output related to the spacing of said rotor planar faces from said pickoffs, whereby angular velocity inputs about the first and second intersecting axes induce precession torque in said rotor about axes substantially orthogonal to said first and second axes respectively, thereby providing first and second outputs respectively.

7. A two axis angular velocity sensor as in claim 6 wherein said rotor comprises a flexible disc.

8. A two axis angular velocity sensor as in claim 6 wherein each of said first and second pickoff means comprises opposing pickoffs mounted on said framework and located on opposite sides of said rotor, together with circuit means for receiving the output from each of said pickoffs and providing said first and second outputs.

9. A two axis angular velocity sensor as in claim 6 wherein said first and second output signals contain a noise signal at a frequency related to the rotational speed of said rotor, together with circuit means for cancelling said noise signal said last named means being coupled to receive said first and second output signals.

10. A multi-axis angular velocity sensor for sensing angular velocity about non-parallel axes, comprising a framework, a motor mounted on said framework, an output shaft on said motor for providing rotational motion, a rotor having a spin axis aligned with and coupled to said motor output shaft, said rotor having a continuous periphery and opposite rotor faces, means integral with said rotor permitting said rotor to deflect in a bending mode in restrained rotation about any rotor diametral axis, so that when angular velocity inputs are applied about the non-parallel axes said continuous rotor periphery moves in restrained rotation about diametral axes which are substantially orthogonal to one of the non-parallel axes, said means integral with said rotor having an angular spring rate operating to urge said continuous rotor periphery toward a neutral spin plane in the presence of torques about said diametral axes, and pickoff means spaced from said rotor faces for producing an output signal related to the position of said rotor face relative to said pickoff means.

11. A multi-axis angular velocity sensor as in claim 10 wherein said rotor comprises a flexible diaphragm attached to said output shaft.

12. A multi-axis angular velocity sensor as in claim 10 together with first and second planar surfaces in spaced proximate relation to each of said opposite rotor faces, whereby gas films are formed between said first and second planar surfaces and ones of said opposite rotor faces when said rotor is spinning, thereby providing gas damping of motion of said continuous rotor periphery in an axial direction.

13. A multi-axis angular velocity sensor as in claim 10 wherein said plurality of pickoff means includes pickoffs spaced from each of said opposite rotor faces positioned on opposite ends of a diameter of said rotor, said pickoffs being interconnected so that rotor periphery deflection in the same direction at opposite ends of the diameter of said rotor due to linear acceleration in a direction parallel to the axis of spin of said rotor produces substantially cancelling components in said output signal.

14. A two axis angular velocity sensor for sensing angular velocity about first and second intersecting axes, comprising a framework, a rotor mounted for rotational movement about a rotor spin axis relative to said framework, a continuous periphery on said rotor having a planar face, a motor mounted on said framework driving said rotor rotationally about said rotor spin axis, said rotor permitting restrained rotation about any diameter thereof and operating to urge said planar face toward a neutral plane of rotation in the presence of torques about any of said rotor diameters, and first and second pickoff means mounted in said framework disposed in spaced relation with said planar faces on said rotor and aligned with the first and second intersecting axes for providing respective first and second output related to the position of said rotor planar faces related to said pickoffs, whereby angular velocity inputs about the first and second intersecting axes induce precession torque in said rotor about axes substantially orthogonal to said first and second axes respectively, thereby providing first and second outputs respectively.

15. An angular velocity sensor providing indication of angular velocity about at least one axis, comprising
a framework,
a rotor member mounted for rotational movement about a rotor spin axis relative to said framework, said rotor having a rotor face and being configured to deflect in bending mode about any diametral axis.
a motor mounted on said framework coupled to drive said rotor member rotationally about said rotor spin axis,
and pickoff means mounted in said framework substantially in alignment with the one axis in spaced relation with said rotor face and providing angular velocity output related to the position of said rotor face relative thereto,
whereby angular velocity about the one axis induces precession torque in said rotor member about an axis substantially orthogonal to the one axis changing the position of said rotor face relative to said pickoff means and providing said angular velocity output.

16. An angular velocity sensor providing indication of angular velocity about at least one axis, comprising
a framework,
a shaft mounted for rotation and defining a rotor spin axis,
a rotor member mounted on said shaft for rotational movement about said rotor spin axis relative to said framework, said rotor having a continuous outer periphery which deflects about at least one diametral axis without deforming said shaft,
a motor mounted on said framework and coupled to said shaft for driving said rotor member rotationally about said rotor spin axis,
and pickoff means for providing an output related to the position of said rotor face relative thereto.

17. An angular velocity sensor providing indication of angular velocity about at least one axis, comprising
a framework,
a rotor member mounted for rotational movement about a rotor spin axis relative to said framework, said rotor having a rotor face and being configured to deflect about at least one diametral axis,
a motor mounted on said framework coupled to drive said rotor member rotationally about said rotor spin axis,
and pickoff means fixedly mounted in said framework in direct confronting relation with but spaced from said rotor face for providing an angular velocity output in direct response to the position of said rotor face relative thereto.

18. An angular velocity sensor as in claim 17 wherein said pickoff means includes two pickoff members located on opposite sides of said rotor member and aligned with one another in a direction parallel to said spin axis.

19. An angular velocity sensor as in claim 18 wherein said pickoff means includes third and fourth pickoff members located on opposite sides of said rotor member and aligned with one another in a direction parallel with said spin axis, said third and fourth pickoff members being located diametrically opposite said two pickoff members relative to said spin axis.

* * * * *